No. 644,772. Patented Mar. 6, 1900.
P. LAPERLE & O. P. BOULARD.
ACETYLENE GAS GENERATOR.
(Application filed Dec. 19, 1898.)
(No Model.) 6 Sheets—Sheet 1.

Witnesses:
H. J. Koerth.
Horace G. Deitz.

Philippe Laperle, Inventors
Oscar P. Boulard
By Marion & Marion
Their Attorneys

No. 644,772. Patented Mar. 6, 1900.
P. LAPERLE & O. P. BOULARD.
ACETYLENE GAS GENERATOR.
(Application filed Dec. 19, 1898.)
(No Model.) 6 Sheets—Sheet 4.

No. 644,772. Patented Mar. 6, 1900.
P. LAPERLE & O. P. BOULARD.
ACETYLENE GAS GENERATOR.
(Application filed Dec. 19, 1898.)

(No Model.) 6 Sheets—Sheet 5.

Witnesses:
Inventors
Philippe Laperle
and Oscar P. Boulard,
By Marion & Marion
Their Attorneys

UNITED STATES PATENT OFFICE.

PHILIPPE LAPERLE AND OSCAR P. BOULARD, OF MONTREAL, CANADA.

ACETYLENE-GAS GENERATOR.

SPECIFICATION forming part of Letters Patent No. 644,772, dated March 6, 1900.

Application filed December 19, 1898. Serial No. 699,751. (No model.)

*To all whom it may concern:*

Be it known that we, PHILIPPE LAPERLE and OSCAR P. BOULARD, subjects of Her Majesty the Queen of Great Britain, residing in the city and district of Montreal, Province of Quebec, Canada, have invented certain new and useful Improvements in Acetylene-Gas-Generating Apparatus; and we do hereby declare that the following is a full, clear, and exact description of the invention, such as will enable others skilled in the art to which it appertains to make and use the same.

Our invention relates to improvements in acetylene-gas-generating apparatus.

The object of our invention is to provide an apparatus of this character in which it is impossible to gain access to the interior without taking the apparatus to pieces, in which the safety feature is predominant, absolutely preventing any liability of explosion, and in addition to which no escape means for the gas excepting the burners is provided within the house.

Another object is to provide a generating apparatus in which the carbid is automatically fed to the water in charges of approximately the same quantity, the charges being automatically formed within the body of the generator.

A further object is to provide a residuum-removing means which is simple in its operation, which is operated from without the generator, and without discontinuing the operation of the apparatus.

A further object is to provide an automatically-operated valve within the gasometer for preventing the return of the gas to the generator.

A further object is to provide an automatic water-feed which will keep the water within the generator and within the gasometer at a predetermined height.

A further object is to provide a feeding device for the carbid which will operate with absolute certainty and operate only when the gasometer has reached a predetermined position.

A further object is to provide an automatic safety escape-pipe by means of which a surplusage formation of gas will not cause the working of the apparatus to become endangered.

A further object is to provide mechanisms to carry into effect the objects hereinbefore set forth.

To these and other ends our invention consists in the improved construction and combination of parts hereinafter fully described, and particularly pointed out in the appended claims.

In the drawings, in which similar numerals of reference indicate similar parts in all of the views, Fig. 17 is a sectional view of a portion of the generator, showing the means for removably securing the upper and lower sections of the generator together. Fig. 18 is a perspective view of the parts shown in Fig. 17, the catch being shown in its open position. Fig. 20 is a vertical sectional view of the same.

1 designates the generator, and 2 the gasometer, each of which will be described separately in order that the various operating parts may be more clearly understood.

The generator is formed of the outer section 3 and inner section 4, which sections are removably secured together, as hereinafter described. The outer section 3 (together with the gasometer) is preferably mounted on a suitable support or stand 5, as shown, in order that the various pipe connections, &c., may be inclosed and not be liable to be broken. As shown, the section 3 is provided with a bottom 6, preferably having the formation of an inverted cone, the apex being provided with a suitable opening 7, connecting with a suitable outlet-pipe 8, the object of which will presently appear. The section 3 is further provided with an internally-arranged flange 9, (best shown in Fig. 22,) upon which the lower edge of the section 4 is adapted to rest, while the inner section 4 is provided with a supplemental flange, which is inclined upwardly and inwardly, as at 10. By reason of this form of support and projecting flange the gas which is formed will be forced inwardly away from any liability of passage through the junction of the two sections 3 and 4, and as said flanges are located below the water-line of the generator it will be readily seen that no gas can pass out from the generator at this point, any carbid which may fall on the flange 10 being decomposed and the gas pass upwardly away from the point of junction of the two sections. In order that the sections 3 and 4 may be held in their proper positions relative to each other, but removable when desired, we have provided the outer section 3 with an annular flange 11, arranged at its top edge, and have provided the inner section 4 on its outer circumference with suitable attachments 12, (best shown in Figs. 17 and 18,) each consisting of two members 13 and 14, the former being secured to the periphery of the inner section and having its lower end provided with suitable knuckle portions adapted to coact with the knuckle portions formed on the hinged member 14, whereby a hinge will be formed. The lower end of the member 14 is provided with an inwardly-extending lug 15, which is adapted when the members are in operative position to pass below the lower edge of the annular flange 11 in the manner shown in Fig. 17. A stop 16 is pivotally connected to the member 13, which stop is adapted to rest on the upper end of the member 14 and hold said member in its proper position; but by reason of the pivotal mounting of the stop it will be readily seen that it may be moved to one side, whereupon the hinged member may be moved outwardly, leaving the inner section 4 in position for ready removal.

Figure 21:
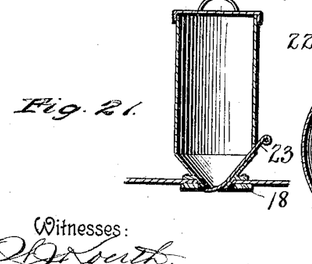
Fig. 21 is a sectional view showing the mechanism used in placing the carbid in the receptacle by means of which the escape of gas is prevented.

The top of the section 4 is provided with a central opening 17, through which the carbid is adapted to be inserted. A reinforcing portion 18 is provided on the under side of the top, said portion 18 having an opening similar to the opening 17, and to the lower face of said portion 18 is hingedly secured a suitable spring-actuated door or valve 19, which is adapted to normally rest against a suitable cushion, formed, preferably, of rubber, secured to the under face of the portion 18, whereby a gas-tight joint will be made. The upper face of the top is provided with suitable catches 20, which are adapted to receive a removable plug 21, which fits on a suitable cushion, preferably formed of rubber, secured to the top of the generator, the construction being such that any escape of gas or inlet of air within the generator will be prevented. When it is desired to refill the carbid-receptacle, the plug 21 is removed by unscrewing the fastening means, if formed as shown in the drawings, which while opening the upper portion of the top does not open the valve or door 19, and the filling attachment 22 (best shown in Fig. 21) is placed in position, after which the sliding door 23, formed in the attachment, is opened and the carbid by its weight opens the door 19 and passes into the carbid-receptacle. Any gas that may escape will pass into the attachment, which prior to its removal from the generator is closed, the attachment being taken from the building and then opened, thus preventing the escape of gas in the building. When the carbid has passed through the opening, the valve or door 19 closes automatically, thus preventing any escape of gas.

Figure 4:
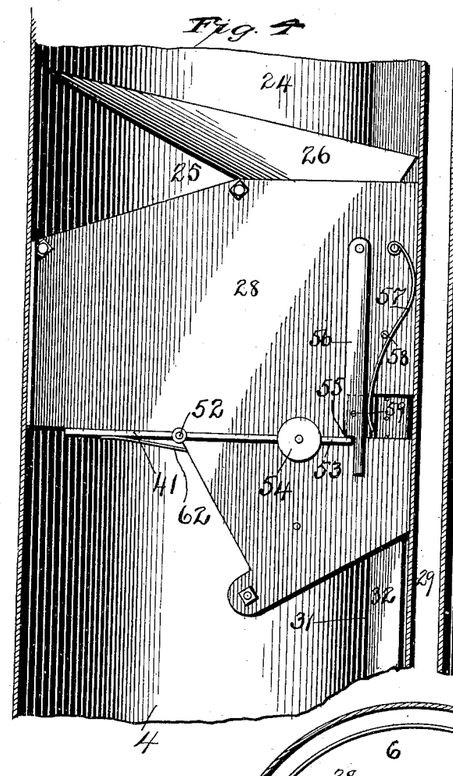
Fig. 4 is a sectional view of the upper portion of the generator, showing the receptacle containing the feeding mechanism and the lever for tripping the door of the carbid-receptacle.
Figure 5:
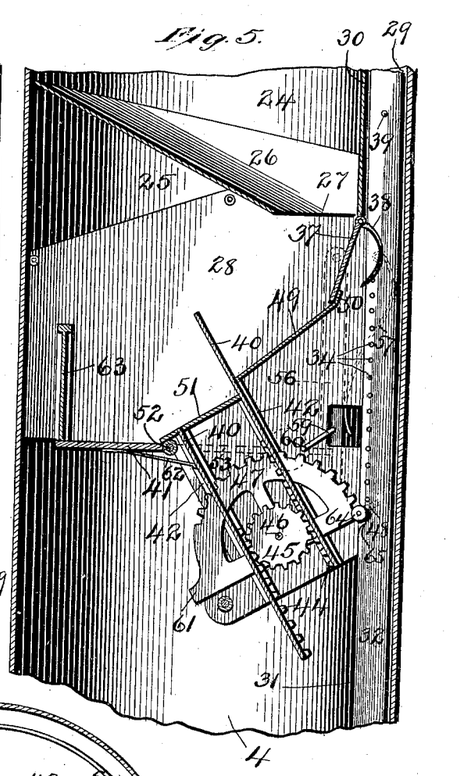
Fig. 5 is a similar view taken centrally of the receptacle containing the feeding mechanism, showing the latter in side elevation.
Figure 6:
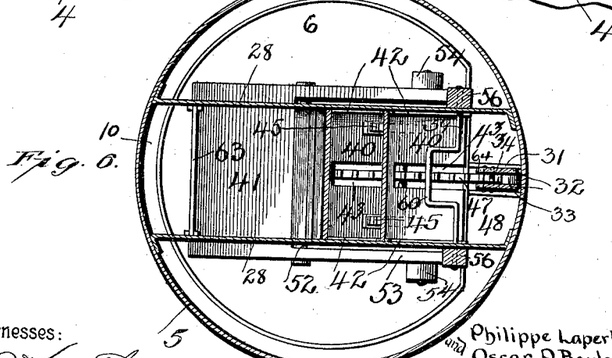
Fig. 6 is a horizontal sectional view of the generator, taken on a line above the feeding mechanism, the latter being shown in plan view.

Referring particularly to Figs. 4, 5, and 6, it will be seen that the generator is divided into two portions at its top, forming two chambers 24 and 25, the chamber 24 being the carbid-receptacle, while the chamber 25 contains the carbid-feeding mechanism. The two chambers are formed by the diametrically-arranged partition 26, formed, substantially, as shown in Figs. 4 and 5, and having an opening 27 arranged therein at one side, as best shown in Fig. 7, the opening 27 being provided for the passage of the carbid from the carbid-receptacle to the generating-chamber.

Arranged vertically within the chamber 25 are two walls 28, located on opposite sides of the center, as best shown in Fig. 6, said walls extending entirely across the generator, being secured to the inner periphery of the section 4 in suitable manner. As shown, the partition or bottom 26 extends downwardly within the space between said walls, the opening 27 lying entirely within said walls.

Figures 7, 22:
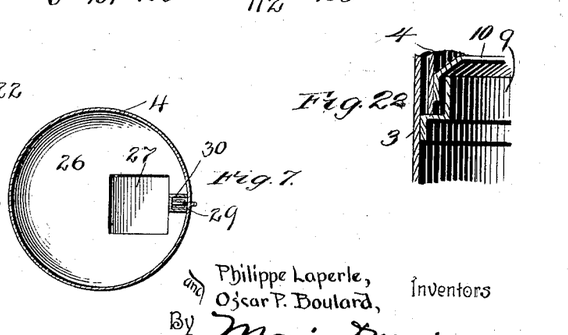
Fig. 7 is a horizontal sectional view of the generator, taken on a line above the bottom of the carbid-receptacle.
Fig. 22 is a detail sectional view of the support for the inner section of the generator and the protecting-flange connected to the inner section.
Figure 10:
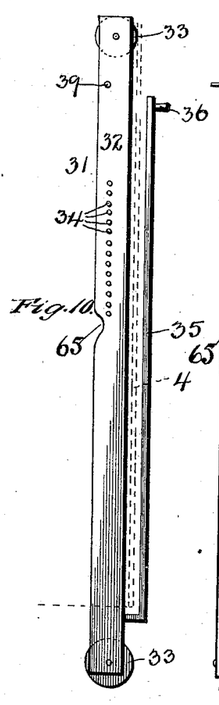
Fig. 10 is a view in front elevation of the mechanism for imparting movement to the carbid-feeding device.

As best shown in Figs. 5 and 7, a supplemental chamber or passage-way 29 is formed in said generator by means of the box portions 30, formed in the carbid-receptacle and in the portion of the generator containing the water below the flange 9, the chamber 29 being formed at the point nearest the gasometer. Within the passage-way or chamber 29 is located a frame 31, (best shown in Figs. 10 and 11,) said frame comprising two vertically-extending plates 32, connected together a small distance apart, suitable rollers 33 being journaled between said plates at their top and bottom, said rollers serving to allow of a free movement of the frame vertically against the walls of the generator. A series of pins 34 are mounted in said plates, which pins serve as teeth to operate the feeding mechanism, as hereinafter set forth. A bar 35 is connected to said frame near its lower end, said bar extending upward outside of section 4 of the generator, and has its upper end provided with a pin 36, which is operatively connected with the bell of the gasometer, the construction being such that as the bell of the gasometer is moved vertically the frame 31 will have a corresponding movement within the generator.

A plate 37 is pivotally connected to the upper box 30 at a point in line with the lower face of the partition or bottom 26, said plate being adapted to have an intermittent movement by reason of the contact of the bearing portions 38, formed to pass on each side of the frame 31, with a pin 39, secured in the frame 31 near its upper end, the contact being made when the outer door 40 is in its lower position, the inward movement of the plate 37 serving to start a movement of the carbid toward the space between the doors 40.

The feeding mechanism is located within the walls 28 and comprises the doors 40, movable vertically at an incline to the operating mechanism, and the door 41, pivotally mounted in said walls, together with the operating mechanism.

Figures 11, 12, 13, 14, 19:
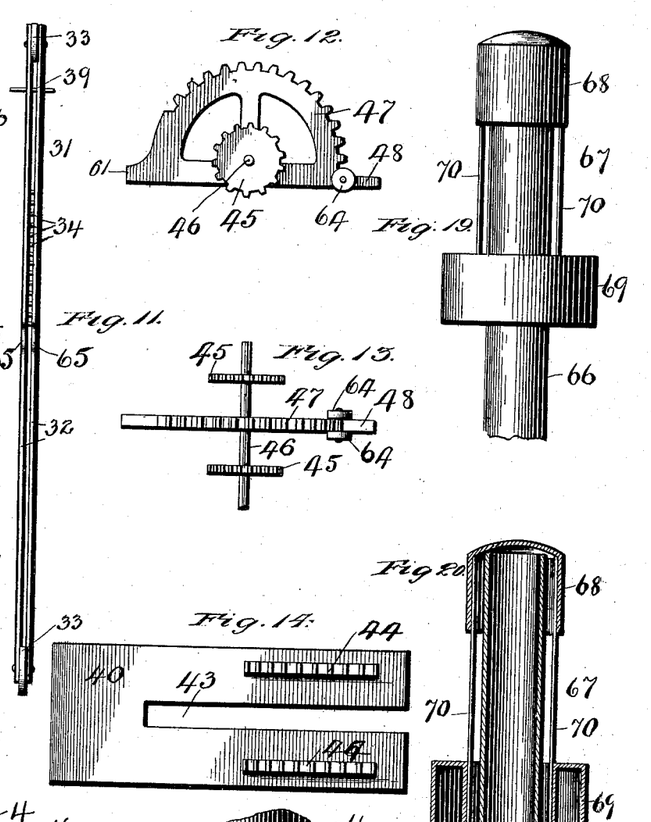
Fig. 11 is a side elevation of the same.
Fig. 12 is a side elevation of the segment and gears which operate the sliding doors of the feeding mechanism.
Fig. 13 is a top plan view of the same.
Fig. 14 is a plan view of one of the sliding doors.
Fig. 19 is a side elevation showing the outlet end of the pipe connecting the generator and the gasometer through which the gas is passed to the gasometer, the automatic valve being shown in position thereon, said valve being adapted to prevent the back pressure and passage of the gas into the generator.
Figure 15:
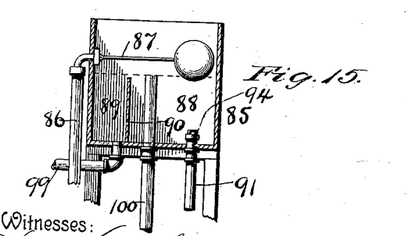
Fig. 15 is a vertical longitudinal sectional view of the water supply or reservoir.

The doors 40 are mounted in suitable slides 42, connected to the walls 28, each door being formed, substantially, as shown in Fig. 14, having a central elongated slot 43 and a rack 44, located on opposite sides of said slot. The doors are mounted with the sides containing the racks 44 facing each other, said racks being adapted to coöperate with pinions 45, mounted on a shaft 46, mounted in the walls 28, said pinions 45 being mounted on opposite sides of a segmental gear 47, arranged centrally on the shaft 46, as shown in Fig. 13. The segmental gear 47 is formed with suitable teeth adapted to act with and be moved by the pins 34 of the frame 31, an elongated tooth 48, arranged at the end of the segment, serving to bring the teeth of the segment into operation with the pins as said frame 31 is moved downwardly, as will be readily understood by referring to Fig. 5. By this arrangement the downward movement of the bell of the gasometer will cause the segmental gear to be moved on its pivot, thereby rotating the pinions 45, which in turn move the doors 40 in their slides 42, one of said doors being moved upwardly, while the opposite door is moving downwardly, the elongated slot 43 allowing of the doors being moved freely without liability of the gear 47 being tampered with in its movement.

The doors 40 are provided for the purpose of forming the carbid charges, holding the charges separated after formation, the charge from the receptacle 24 passing through the opening 27 onto a plate 49, secured between the walls 28 and arranged at an inclination, as shown, the door 37 resting against a flange 50, formed on the plate 49, the inclination of the parts being sufficient, aided by the movement of the plate 37, to cause the carbid to fall downward against the door 40, located nearest the frame 31, this door being in its raised position when the carbid is passed from the receptacle. As the bell of the gasometer is moved downward by the withdrawal of the gas the door against which the carbid is resting is gradually moved downward, the opposite door moving upward at the same time, the positions of the doors being exactly reversed when the bell of the gasometer has reached its lowermost position. It will be seen that at this time a portion of the carbid will pass from off the plate 49 onto the plate 51, located between the doors and forming a bottom, at which time the carbid charge will be formed by the upward movement of the bell of the gasometer, caused by the generating of the gas by a previous charge moving the frame 31 upward, returning the gear 47 to its initial position and at the same time moving the positions of the doors 40 until they have again passed to the position shown in Fig. 5, whereupon the carbid will pass from the plate 51 onto the door 41, ready to be discharged by the opening of the door 41.

The mechanism for operating the door 41 to pass the carbid into the water comprises the tripping mechanism. (Best shown in Figs. 4, 5, and 6.) As will be seen, the door 41 is pivotally mounted on a rod 52, the pivotal connection being without the walls 28, the door being provided with extensions 53, extending laterally from said pivotal points, said extensions being provided with weights 54, as shown. The ends of the extensions 53 are adapted to normally rest within a notch 55, formed at the lower end of the pivotally-mounted levers 56, the levers being held in such position by the springs 57, the latter having their movement limited by the stops or pins 58, secured to the walls 28. The levers 56 are connected to have similar movement by means of a rod 59, having its central portion bent inwardly, as at 60, said bent portion extending into the path of the movement of the extension 61, formed on the segmental gear 47. By this construction it will be seen that as the gear 47 is rotated by the downward movement of the gasometer-bell the door 41 will be held closed by the levers 56 until the extension 61 contacts with the bent portion 60, whereupon further downward movement will cause the levers 56 to be moved outwardly until the extensions 53 are disengaged from the notches 55, whereupon the weight of the charge of carbid on the door 41 will cause it to be moved on its pivot, dumping the carbid into the water or liquid, and the generation of gas ensues. As before set forth, when the frame 31 has reached its lower limit of movement the inner door is in its raised position, thus holding the carbid on the plate 51 and allowing only the carbid on the door to be precipitated into the water, the raising of the frame 31 moving the extension 61 away from contact with the bent portion 60, allowing the levers 56 to pass to their normal position by the action of the springs 57, the door 41, as soon as the carbid has been dropped, returning to its normal position by reason of the weights 54, which are sufficient to more than counterbalance the weight of the door 41. To further hold the door 41 in its proper position or force it in such a position if by accident it should not reach it, we provide a suitable spring-arm 62, connected to the under side of the door 41 and extending against the inner door 40, said arm being freed from the action of said door when the door has moved upward a sufficient distance for the slot 43 to be in front of the end of the arm, when the door 41 is ready to be dropped, as hereinbefore described. As the door 41 is moved the arm 62 passes through the slot 43. When the door 40 passes downward, the solid portion of the door 40 will abut against the arm if remaining within the slot 43, and as the door 40 continues its downward movement the arm will cause the door 41 to be moved into its proper position. Should by any means a piece of the carbid remain in such a position as to prevent the door from passing upward, the sliding plate 63, mounted in suitable slideways and having a stop to limit its downward movement, said plate forming the remaining wall to complete the chamber holding the carbid above the door 41, will be raised, and thus allow the door 41 to properly seat itself.

In order that the gear 47 and the remaining operating parts may not be accidentally rotated, we have provided rollers 64, arranged on opposite sides of the gear 47, which rollers are adapted to pass into suitable recesses 65, formed on the plates 32, when in operative position, passing therefrom only when the frame 31 is moving downward, in which case the rollers will be passed from said recesses, but will be in proper position to return thereto by reason of the continual engagement of the teeth of the gear 47 with the pins 34, and when said frame 31 passes upward beyond the operative contact of the lower pin 34 with the tooth 48, whereupon the rollers 64 will ride against the edge of the plates 32, preventing the movement of the gear 47 until the frame 31 again moves downward and the lower pin 34 engages with the tooth 48, whereupon the rollers will be forced into the recesses 65 and be allowed to have its regular movement.

After the gas has been formed by the dropping of the carbid into the water, as hereinbefore described, it is passed through the connecting-pipe 66 to the gasometer, a pipe of comparatively-large diameter being preferably used. The end of the pipe 66 within the gasometer is provided with a valve 67, preferably formed as shown in Figs. 19 and 20, said valve consisting of the inverted-cup-shaped portion 68, to which is connected the circular ring-shaped portion 69 by depending rods 70, said portion 69 being preferably hollow, as shown, in order that it may have buoyancy, the portion 68 being of but slightly greater weight than the buoyancy of the portion 69 will carry, in order that the valve will normally remain closed, yet respond to any movement of the gas from the generator, the pressure within the gasometer holding it normally on its seat.

It is to be understood that the outlet-opening of the pipe 66 is above the water-level in the gasometer, while the lower edge of the portion 68 normally rests below this level.

Figure 1:
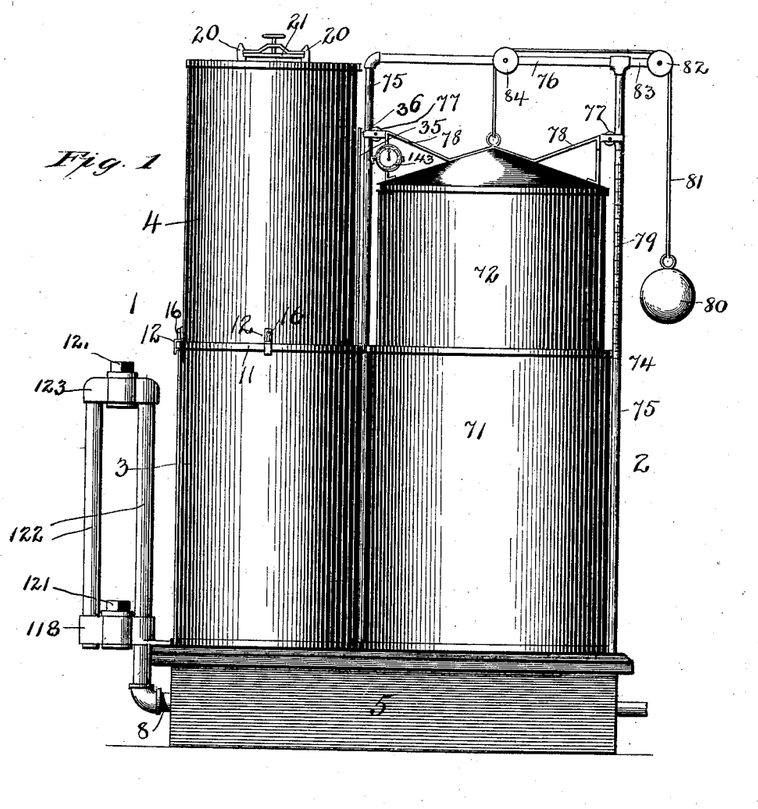
Figure 1 is a front elevation of our improved acetylene-gas-generating apparatus.
Figure 2:
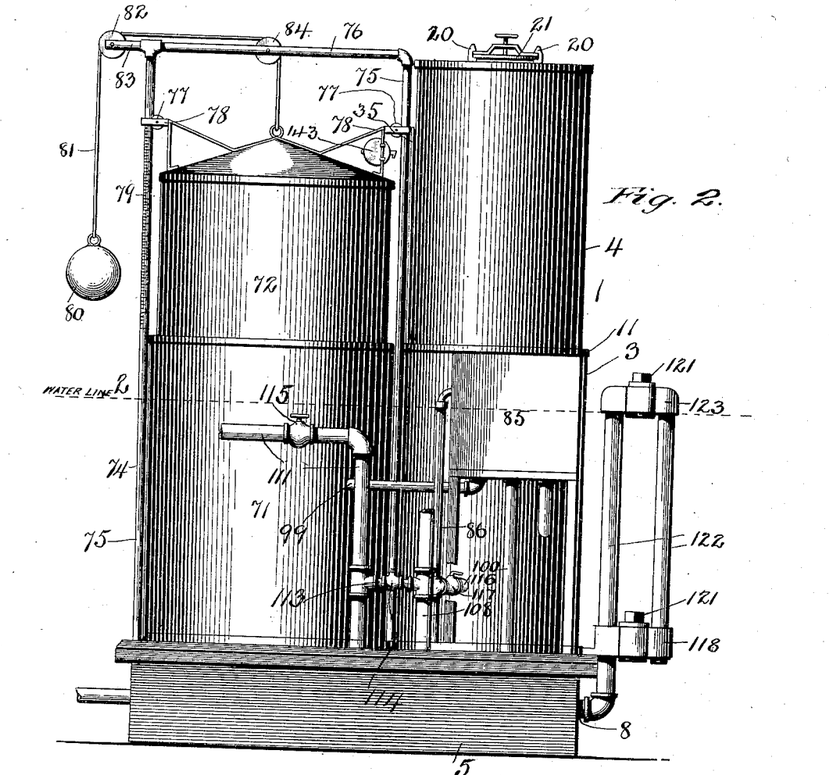
Fig. 2 is a rear elevation of the same.

As shown, the gasometer comprises the stationary section 71 and bell or telescoping section 72, the latter being provided with suitable rollers 73 at or near its lower edge, which rollers are adapted to hold the bell in its position at all times. A supporting-frame 74, secured to the stand 5 and comprising the vertical standards 75, connected at their upper ends by the cross-bar 76, serve to support and hold the bell 72 in proper position, this being accomplished by means of the concave rollers 77, mounted in a frame 78, secured to the top of the bell 72, resting loosely against the standards 75, as shown in Fig. 2. The outer standard 75 is provided with suitable graduated marks 79, by means of which the amount of gas remaining in the gasometer may be readily determined, the portion of the frame 78 passing over the marks 79 making the indication. If desired, a suitable weight 80 may be secured to the bell 72 by means of the connection 81, said connection passing over a pulley 82, mounted in an extension 83, formed on the frame 74, and over a pulley 84, mounted centrally of the cross-bar 76, said weight serving as a counterbalance for the bell of the gasometer in the usual manner in devices of this character.

As it is essential that the generator and gasometer be kept supplied with water in order that a uniform level is maintained in both, we have provided the construction now to be described, by means of which the water-level in both generator and gasometer will be retained at any predetermined height.

85 designates a water-receptacle which receives its supply of water through a pipe 86, connected to the source of supply, preferably the waterworks, in order that a pressure may be secured, for a purpose hereinafter described, the level of the water within the receptacle 85 being regulated by means of a suitable ball-cock 87, connected to the pipe 86 in suitable manner.

The receptacle 85 is divided into two compartments 88 89 by means of a partition 90, which extends upwardly from the bottom to a point a small distance below the water-level in the receptacle, the compartments 88 89 being adapted to contain the water for the generator and the gasometer, respectively. The compartment 88 is connected to the generator by means of a pipe 91, having its outer end located within the compartment 88 at a point close to the bottom thereof and having its inner end connected to and leading into the generator below the water-level.

Figure 16:
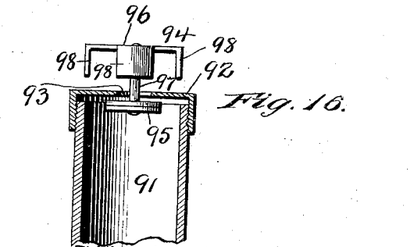
Fig. 16 is a sectional view of the upper end of the water-supply pipe for the generator, showing the valve for automatically closing the inlet against the back pressure of the water when the gas is being generated.

As best shown in Fig. 16, the outer end of the pipe 91 within the compartment 88 is provided with a screw-threaded cap 92, having a central opening 93 for the passage of the water. A valve 94 is provided for the purpose of closing the opening 93 when gas is being generated, preventing the forcing of the water back into the receptacle 85 when the pressure in the generator is increased during the period of generation. The valve 94 consists, essentially, of the disk portion 95, located within the pipe 91, and the supporting-plate 96, connected to the portion 95 by the rod 97, the plate 96 being located above the cap 92 and provided with downwardly-extending flanges 98, which rest on the cap 92 when the valve is in its lower position, the flanges 98 holding the main portion of the plate out of contact with the cap in order that the opening 93 may not be closed, allowing the water to pass within the generator when the water-level in the generator passes below that of the level of the water in the compartment 88. When, however, the gas is being generated, the pressure within the generating-chamber will cause the disk portion 95 to be moved against the under face of the cap 92, thus closing the opening 93 and preventing the return of the water to the compartment 88.

The connection between the compartment 89 and the gasometer is made by means of a pipe 99, which leads from said compartment to and through the section 71 of the gasometer, the water being delivered at a point where no interference will be made to the free movement of the section 72.

The compartment 89 is provided for the purpose of keeping the water in the gasometer at the same level regardless of the amount of water in the generator. By keeping the level at all times the cap 68 is held in proper position to prevent the waste of gas, the dropping of the water below the cap tending to break the slight water seal normally existing around said cap.

Figure 8:
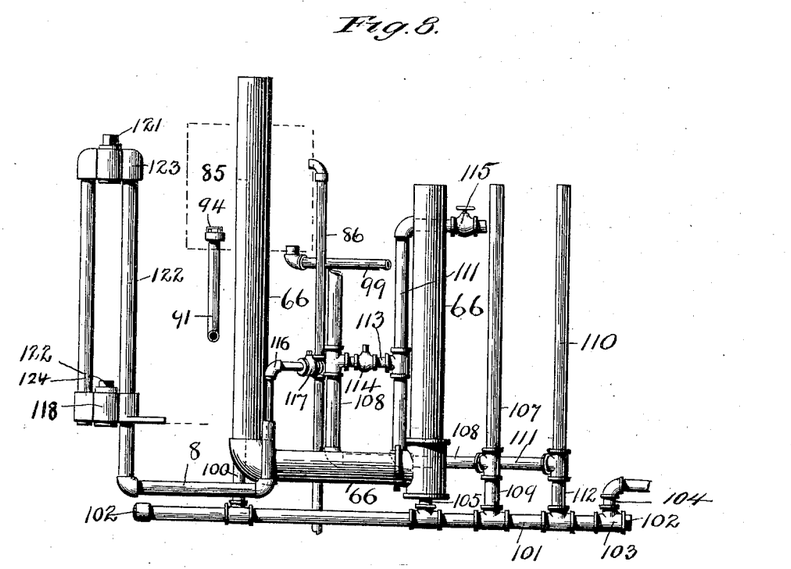
Fig. 8 is a view showing the various arrangements of pipes, &c., connected to the generator and gasometer by means of which the parts of the apparatus are operated.
Figure 9:
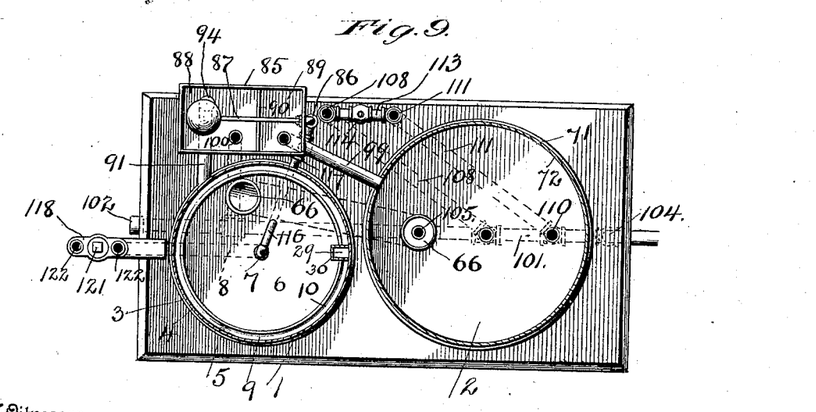
Fig. 9 is a sectional view of the generator and gasometer, taken horizontally, showing in plan view the positions of the various pipes, &c., shown in Fig. 8.

The level of the water in the receptacle 85 is regulated by means of the overflow-pipe 100 extending into the receptacle, the lower end of said pipe being connected to pipe 101, located below the stand 5, said pipe extending in a straight line and having removable plugs 102 arranged at its ends, by means of which it can be readily cleaned by removing the plugs 102 and passing a rod therethrough, removing all residue, &c. As best shown in Fig. 8, the pipe 101 has one end provided with a suitable T 103, from which a short pipe 104 extends upwardly and is then carried away from the apparatus to the sewer or other suitable source of outlet, the arrangement of pipe 104 being to provide a seal in the pipe 101 and each of the connecting-pipes, by means of which air will be prevented from entering the apparatus or gas be passed therefrom. As shown in Fig. 8, the pipe 66 is connected to the pipe 101 by means of the connecting-pipe 105, thus providing an outlet for any water of condensation which may accumulate in the pipe 66.

By the construction above described we are enabled to hold the water in the seals of the generator and the gasometer at predetermined heights and approximately at the same height as the water within the receptacle 85. While it is true that as in all apparatus of this character the water located within the inner chamber of the generator or gasometer is below the normal level of the water seal by reason of the pressure within such chamber being greater than the atmospheric pressure of the water seal, yet the water-level of these portions of the apparatus may be determined by the height of the water in the seal, inasmuch as an increase or diminishing of the height of the water seal can take place only with a similar increase or decrease of the body of water within the generator or gasometer as long as the pressure remains approximately the same.

In the present apparatus the pressure both within the generator and gasometer is governed by the weight of the bell of the gasometer. Hence the level of the water within these portions of the apparatus remains in the same relative position to each other, although it may be raised or lowered by the increase or decrease of the weight of the bell, and as the pressure in each is equal it will be obvious that the water seal in each will be of the same depth, the width of said seal being substantially the same in each.

As the height of the water seal will remain the same whether the level of the water is increased or diminished, it will be readily seen that if water is introduced into the water seal, as in the case of the gasometer shown herein, its height will only increase equally with the increase of height within the gasometer, and as the height of this water seal is governed solely by the height of the water in the receptacle 85 it will be readily seen that the height of the water in said receptacle and the seal of the gasometer will be held on approximately the same plane relatively to each other.

In the case of the generator shown herein, in which the bell portion remains fixed and free from movement under pressure, the action is somewhat different. As above stated, the height of the water seal will be substantially the same as in the seal of the gasometer. If, therefore, as shown herein, water is introduced directly into the body of the generator, its effect will be to raise the water-seal level, and this will continue until the height of the water seal be approximately on the same plane as the height of the water in the receptacle 85, from which the water is obtained. It will therefore be seen that although the pressure within the generator is greater than the atmospheric pressure on the water seal water will pass into said generator from the receptacle 85 until the height of the seal is on a plane with the level of the water within said receptacle. Any liability of the prevention of the entry of water into the generator by reason of the excess of gas-pressure is prevented by the fact that as long as the water-level of the seal is lower than that of the receptacle there is a greater pressure within said receptacle and the tendency will be to equalize said pressure and also to the fact that the tendency to compress the gas in the generator would simply cause the bell of the gasometer to be raised, the pressures in both generator and gasometer equalizing in an obvious manner. From this it will be understood that the atmospheric pressure governs the height of the water seal in each of the portions, and hence the level of the seal in the generator and gasometer will be automatically regulated by the level in the receptacle and the depth of the seal will be equalized in both of these portions of the apparatus.

To prevent any dangerous results occurring by reason of an accidental formation of a surplusage of gas, we have provided the safety device, consisting of the outer tubular portion 106, connected to the under side of the top of the bell portion 72, and the inner tubular portion 107, the latter being adapted to be passed within the portion 106. The portion 106 extends downwardly a sufficient distance as to hold the open end thereof to normally remain below the water-level of the gasometer, the water located therein forming a water seal in an obvious manner. When, however, the bell 72 is caused to move upward a greater distance by an excessive generation of gas, the portion 106 is carried above the level of the water, thus allowing the gas to pass outward through the pipe 107 into the pipe 108, which pipe leads to a point outside the building occupied by the generating apparatus. The pipe 107 is also connected to the pipe 101 by means of the pipe 109, as shown, to form a means for carrying off any water of condensation or other matter which may find its way into the pipe 107.

After the generated gas has passed into the gasometer 2 it is passed into the pipe 110, having its inner end located within the gasometer, from which it enters the service-pipe 111 and is carried through said pipe to the point of consumption. The pipe 110 is connected to the pipe 101 by means of the pipe 112 to take up the various foreign substances which may be found in the gas and in the pipes 110 and 111.

From the construction just described it will be readily seen that each of the pipes 66, 100, 107, and 110 are all connected to the pipe 101 in such manner that a water seal will be provided, yet a receptacle is formed which will retain all impurities formed in the gas and will allow of a ready cleansing of the apparatus by removing the plugs 102, as hereinbefore described, but which will prevent the escape of gas as well as the inlet of air, the overflow-pipe 100 serving to keep the pipe 101 full of water at all times.

As it is sometimes desirable that the gasometer be relieved of the gas in order that it may be readily cleaned, we have placed as a means for allowing of the discharge of the gas a connecting-pipe 113 between the pipes 108 and 111, in which pipe is placed a cock 114, by means of which the pipe 113 may be opened or closed, as desired. We also provide the pipe 111 with a valve 115, which serves to close the service-pipes when so desired. From this it will be seen that upon opening the cock 114 the gas will pass into the escape-pipe 108, and thus to the outer atmosphere, thus relieving the gasometer of the gas without danger or smell. This construction is especially useful in the driving of the air from the generator and gasometer when the apparatus is first installed, the preparation of the apparatus for use being as follows:

As acetylene gas when combined with air in quantities ranging from one part of air and twenty-five parts of gas to equal parts of each is dangerously explosive, and especially where the combination is one part of air and nine parts of gas, it is absolutely necessary that the quantity of air in the apparatus should be as small as possible, the absence of air making it impossible for the gas to explode. As it is impossible to install the apparatus without both generator and gasometer containing air, the apparatus is charged with carbid and the valve 115 closed, the doors 40 being in a position opposite that shown in Fig. 5, the carbid being on the plates 49 and 51. The water is then turned on from the hydrant into the gasometer, the entrance of the water causing the bell to rise by reason of the confined air, the rising of the bell causing the doors 40 to change their positions back to what is shown in Fig. 5, at which time the carbid on the plate 51 passes onto the door 41. The valve 113 is then opened, allowing the air within the gasometer to escape, allowing the bell to descend, and thus trip the doop 41, and dropping the carbid into the water-generating gas, and the cock 114 closed until the bell has reached its upper position. The generating of the gas forces the air from the generator into the gasometer, and as more gas is generated than will be held in the generator the surplusage will pass into the gasometer with the air. The mixture now contained in the gasometer is dangerous, (as in the case of all acetylene-gas generators, it being absolutely impossible to set up an apparatus without air remaining therein,) and it is necessary to remove this as speedily as possible. As the first generation of the gas has raised the bell of the gasometer, it is in proper position to operate the feeding mechanism. The cock 114 is now opened, which allows the mixture to pass out of the gasometer to the open air through the pipes 110, 111, 113, and 108. This escape causes the bell of the gasometer to drop, and at about the time when a new charge of carbid is precipitated into the generator the cock 114 is closed, which allows the gasometer to again be raised. As a matter of precaution this second charge of gas is passed outward through the channel just described, this second charge carrying with it all air which may have remained in the gasometer after the first relieving, leaving the third charge absolutely pure. As no air is admitted during the operation of the apparatus at any time, it will be seen that the gas generated will be absolutely pure.

Figure 3:
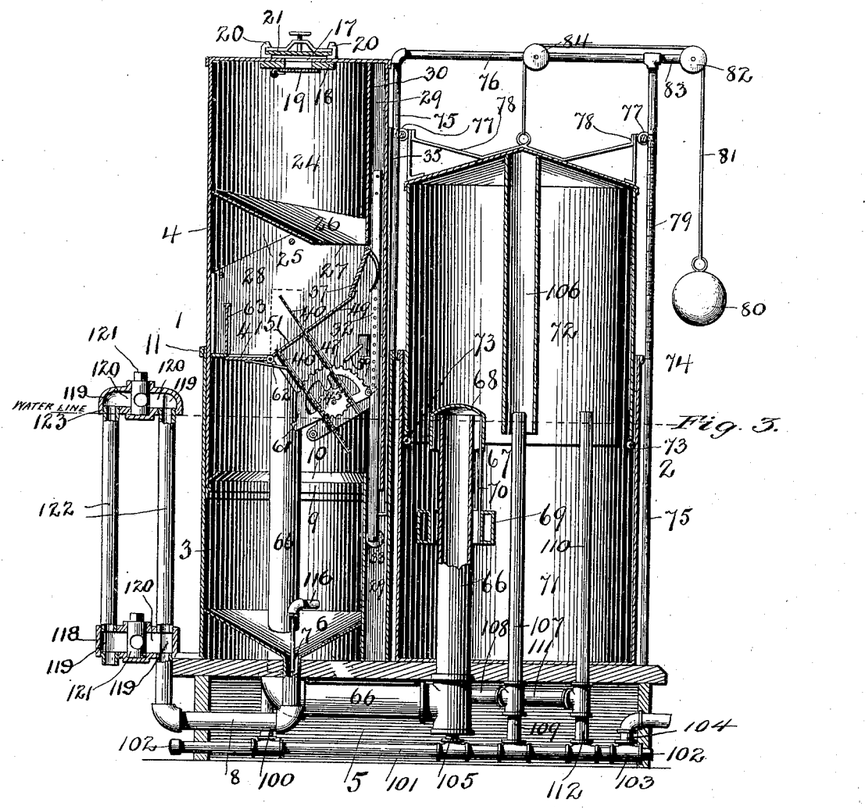
Fig. 3 is a vertical longitudinal sectional view of the same.

In the generating of the gas a residuum results from the decomposition of the carbid, and being heavier than the water this resulting residue collects on the bottom of the chamber. As shown, the bottom 6 is of inverted-cone shape, causing the residue to pass toward the center through the opening 7 into the pipe 8. This residue must be removed, and to do so without allowing the contents to be exposed in the building, causing a bad smell, and without admitting air to the apparatus we have provided the following-described construction: The hydrant-pipe 86 is tapped at a suitable point outside the generator, and a small pipe 116, having a cock 117, secured to the pipe 86, said pipe being carried into the generator, the end of the pipe being carried downward into the pipe 8 a suitable distance. The pipe 8 is continued laterally a suitable distance and then carried upwardly into a connection 118, formed substantially as shown in Fig. 3, having two vertical openings 119 and a connecting-opening 120, in which is located a cock 121, which serves to close the opening between the openings 119. Suitable pipes 122 extend upwardly from the openings 119 and at the upper end are connected by a connection 123, similar to the connection 118, with the exception that the openings 119 are not continued through the connection, being only connected to the opening 120. The outer opening of the connection 118 is provided with a pipe leading outside the building to a suitable point or connected to the sewer in an obvious manner, the latter being preferable.

When it is desired to remove the residuum, the cock 121 in the connection 123 is first opened, this cock in both connections remaining normally closed. As the water in the generator is at a point a short distance below the opening 120 in the connection 123, it will be apparent that no gas may escape or air enter when said cock is opened. The cock 117 is then opened, allowing the water from the hydrant-pipe 86 (which water is under pressure) to pass into the pipe 8 until the level of the water is raised to the height of the opening 120 in the connection 123, whereupon the water will flow out of the generator, carrying with it the residuum located within the generator, the placing of the outlet end of the pipe 116 within the pipe 8 serving to increase the readiness with which the residuum will be removed by reason of the suction formed. If, however, it is found that the residuum is not readily moved by reason of its not having been taken from the generator for a long time, the cock 121 in the lower connection 118 is opened, thus creating an outlet below the level of the water in the generator, securing the pressure of the water within the generator in addition to the pressure of the hydrant and insuring the removal of the residuum.

As the carbid is placed in the generator in bulk and automatically formed into charges, it is desirable that indicating mechanism be employed by means of which an approximate estimate of the amount of carbid remaining in the generator may be obtained, to insure its refilling at the proper time. In the drawings this mechanism is designated as 143.

The operation of the various parts has been clearly set forth, and as the various steps of the general operation have been indicated it is thought unnecessary to reiterate them in detail.

The advantages of this construction are many. Among them may be named the automatic formation of the charges by the doors 40, the movement of the doors having the action of a knife in cutting through the carbid, pushing the particles to either side. The several attempts heretofore made to accomplish this end have proved failures by reason of the mechanism working against a fixed surface, necessarily causing a jam, with breakage of parts or a stoppage of the mechanism, when portions of the carbid become wedged between the mechanism and the fixed surface. This is obviated by the movement of the doors 40 upward simply cutting through the carbid or pushing it to one side, there being no fixed surface against which it might become jammed. As before stated, the carbid, normally resting on the plate 49 until the outer door 40 is moved downward by the movement by the gasometer, is moved toward the space between the doors 40 by the movement of the door 37, thus insuring the free running of the carbid.

The advantages resulting from the adaptability of the apparatus to be filled, emptied, cleaned, &c., without the waste of gas and smell passing into the house, as well as the absolute prevention of the inlet of air during these various operations, form essential features which will be readily understood to be of great value to the user.

In addition to the advantages above set forth we would mention the ability to recharge the generator without disturbing the operation, it being possible to recharge at the same time the gas is being generated; the entire cessation of gas generation, excepting at the moment when the bell of the gasometer has reached its lower limit of movement; the cool generation of gas; the washing of the gas; the taking up automatically of water condensation from all pipes; the uniform pressure of the gas, giving a steady light, and the ease with which the residue may be removed.

As shown in the drawings and as heretofore set forth, the generating-chamber is divided into two portions by means of the portion 26. By referring to Fig. 5 it will be readily seen that the parts of the mechanism below the portion 26 are located within the generating-chamber, the gas which is formed passing upwardly and into these working parts. In addition to this the gas is allowed to pass upwardly into the carbid-receptacle, the opening 27 being always open, with the exception of when the carbid may be within this opening, and this passing of the gas into the carbid-receptacle serves to dry the gas, any moisture in the gas being absorbed by the carbid and new gas generated. It will also be seen that all of the operating parts for forming the charge of carbid and delivering it to the generating-chamber are located within the chamber itself, so that in case of a fire there would be nothing exposed to the action of the fire, the bulk carbid being within a chamber which is held gas-tight by means of the water-seal. This is not the case where the carbid-receptacle and the operating mechanism are located outside of the chamber itself, as in the latter case there is always liability of leaks, and thus aid the conflagration.

As heretofore set forth, the present apparatus is intended for use solely in connection with carbid introduced in bulk, the charges being formed automatically during the passage of the carbid over the runway. It is not suitable for use where the charges are prepared before placing within the carbid receptacle or runway, and it is to be understood that the term "runway" used herein has reference solely to a runway over which the carbid passes in bulk and that the term "compartment" is to be construed as referring to a compartment adapted to receive and contain carbid which is placed within the generator in bulk and passed from said receptacle onto the runway prior to its being formed into charges.

While we have herein shown a preferred form of carrying our invention into effect, yet we do not desire to limit ourselves to such preferred details of construction, but claim the right to use any and all modifications thereof which will serve to carry into effect the objects to be attained by this invention in so far as such modifications and changes may fall within the spirit and scope of our said invention.

What we claim as new is—

1. An acetylene-gas generator, adapted to generate gas from carbid introduced in bulk, comprising a generating-chamber; a carbid-runway located therein, said runway having an open top; means for forming compartments in said runway each compartment having an open top; and means for precipitating the contents of one of said compartments into the generating-chamber.

2. An acetylene-gas generator, adapted to generate gas from carbid introduced in bulk, comprising a generating-chamber; a carbid-runway located therein, said runway having an open top; means, automatically operated by the increase and decrease of the volume of gas, for forming compartments in said runway, each compartment having an open top; and means for precipitating the contents of one of said compartments into the generating-chamber.

3. An acetylene-gas generator, adapted to generate gas from carbid introduced in bulk, comprising a generating-chamber; a carbid-runway located therein, said runway having an open top; doors located in said runway, movable into and out of a position within said runway, forming compartments, each compartment having an open top; and means for precipitating the contents of one of said compartments into said generating-chamber.

4. An acetylene-gas generator, adapted to generate gas from carbid introduced in bulk, comprising a generating-chamber; a carbid-runway formed therein, said runway having an open top; doors mounted to have a movement into and out of said runway, said doors being movable in opposite directions, whereby compartments will be formed, each compartment having an open top; and means for precipitating the contents of one of said compartments into the generating-chamber.

5. An acetylene-gas generator, adapted to generate gas from carbid introduced in bulk, comprising a generating-chamber; a carbid-runway located therein, said runway having an open top; doors mounted to have a movement into and out of said runway, the movement of the doors being simultaneous, the movement of each door being in a direction opposite that of the other, whereby compartments will be formed, each compartment having an open top; and means for precipitating the contents of one of said compartments into the generating-chamber.

6. An acetylene-gas generator, adapted to generate gas from carbid introduced in bulk, comprising a generating-chamber; a carbid-runway located therein; doors mounted to have a movement into and out of said runway, the movement of the doors being simultaneous, the movement of each door being in a direction opposite that of the other, whereby compartments will be formed; and means for precipitating the contents of one of said compartments into the generating-chamber.

7. An acetylene-gas generator, adapted to generate gas from carbid introduced in bulk, comprising a generating-chamber; a carbid-runway located therein, said runway having an open top; doors mounted to have a movement into and out of said runway, said doors being movable in opposite directions, whereby compartments will be formed, each compartment having an open top; means for imparting movement to said doors intermittently; and means for precipitating the contents of one of said compartments into the generating-chamber.

8. An acetylene-gas generator, adapted to generate gas from carbid introduced in bulk, comprising a generating-chamber; a carbid-runway located therein, said runway having an open top; doors mounted to have a movement into and out of said runway, the movement of the doors being simultaneous, the movement of each door being in a direction opposite that of the other, whereby compartments will be formed each compartment having an open top; means for imparting movement to said doors intermittently; and means for precipitating the contents of one of said compartments into the generating-chamber.

9. A carbid-charge former, comprising a carbid-runway; a series of doors movable into and out of position in said runway, said doors moving vertically from the lower side of said runway in opposite directions, one of said doors being adapted to separate the charge from the bulk carbid; and means for imparting movement to said doors.

10. A carbid-charge former, comprising a carbid-runway having an open top; a series of doors movable into and out of position in said runway, said doors moving vertically from the lower side of said runway in opposite directions, one of said doors being adapted to separate the charge from the bulk carbid; and means for imparting movement to said doors.

11. A carbid-charge former, comprising a carbid-runway; a series of doors movable into and out of position in said runway, said doors moving vertically from the lower side of said runway, in opposite directions, the movement of said doors being simultaneous, one of said doors being adapted to separate the charge from the bulk carbid; and means for imparting movement to said doors.

12. A carbid-charge former, comprising a carbid-runway, having an open top; a series of doors of a width equal to the width of the runway and movable into and out of position in said runway, said doors moving vertically from the same side of said runway, in opposite directions, the movement of said doors being simultaneous, one of said doors being adapted to separate the charge from the bulk carbid; and means for imparting movement to said doors.

13. An acetylene-gas generator, comprising a generating-chamber; a carbid-runway located therein; doors mounted to have a movement into and out of said runway, said doors having rack-bars; pinions mounted between said doors and coöperating with said rack-bars; and means for imparting movement to said pinions, whereby said doors will be given a positive and simultaneous movement in opposite directions.

14. An acetylene-gas generator, comprising a generating-chamber; a carbid-runway located therein; doors mounted to have a movement into and out of said runway, to form compartments therein, said doors having rack-bars; pinions mounted to have a positive coöperating relation to each of said doors; means for imparting movement to said pinions, whereby said doors will have a positive and simultaneous movement; and means for precipitating the contents of one of said compartments into the generating-chamber.

15. An acetylene-gas generator, comprising a generating-chamber; a carbid-runway located therein; doors mounted to have a movement into and out of said runway, to form compartments therein, said doors having rack-bars; pinions mounted to have a positive coöperating relation to each of said doors; means for imparting movement to said pinions, whereby said doors will have a positive and simultaneous movement; means for limiting the movement of said pinions, whereby the length of movement of said doors will be regulated; and means for precipitating the contents of one of said compartments into the generating-chamber.

16. An acetylene-gas generator, comprising a generating-chamber; a carbid-runway located therein; doors mounted to have a movement into and out of said runway, to form compartments therein, said doors having rack-bars; pinions mounted to have a positive coöperating relation to each of said doors; means for imparting movement to said pinions, whereby said doors will have a positive and simultaneous movement; and means for precipitating the contents of one of said compartments into the generating-chamber, said means being operated at a predetermined point in the movement of said frame, whereby the movement of said pinions in one direction will be automatically limited and the length of movement of the doors be regulated.

17. An acetylene-gas generator, comprising a generating-chamber; a carbid-runway located therein; doors mounted to have a movement into and out of said runway, to form compartments therein, said doors having rack-bars; pinions mounted to have a positive coöperating relation to said rack-bars; a vertically-moving frame located within said generator; connections between said frame and said pinions for imparting a positive and simultaneous movement to said doors when said frame has reached a predetermined point in its movement; and means for precipitating the contents of one of said compartments into the generating-chamber.

18. An acetylene-gas generator, comprising a generating-chamber; a carbid-runway located therein; doors mounted to have a movement into and out of said runway, to form compartments therein, said doors having rack-bars; pinions mounted to have a positive coacting relation to said rack-bars; a segmental gear adapted to impart movement to said pinions; a vertically-moving toothed frame located in said generating-chamber, said frame, during a predetermined period of its movement, imparting a movement to said gear, whereby said doors will be given a positive and simultaneous movement; and means for precipitating the contents of one of said compartments into the generating-chamber.

19. An acetylene-gas generator, adapted to generate gas from carbid introduced in bulk, comprising a carbid-receptacle located within said generator; a generating-chamber; a carbid-runway mounted within said chamber and adapted to receive the carbid from said receptacle, said runway having an open top, whereby the generated gas will be allowed to mingle with the carbid in said runway and said receptacle, thereby drying the gas; and means for delivering the carbid in automatically-regulated quantities from said runway, to be decomposed.

20. An acetylene-gas generator, adapted to generate gas from carbid introduced in bulk, comprising a generating-chamber; a carbid-receptacle located therein; a carbid-runway formed in said receptacle; means, mounted in said runway, for positively forcing said carbid along said runway; means for forming a carbid charge during the passage of the carbid over said runway; and means, located in said runway for precipitating a quantity of the carbid into the generating-chamber.

21. An acetylene-gas generator, adapted to generate gas from carbid introduced in bulk, comprising a generating-chamber; a carbid-receptacle located therein; a carbid-runway located in said chamber; means, mounted within said runway for positively forcing the carbid along said runway; doors located in said runway and movable into and out of a position within said runway, to form compartments therein; means for imparting movement to said doors; and means for precipitating the contents of one of said compartments into the generating-chamber.

22. An acetylene-gas generator, adapted to generate gas from carbid introduced in bulk, comprising a generating-chamber; a carbid-receptacle located therein; a carbid-runway located in said chamber; means, automatically operated by the movement of the gasometer-bell, for positively forcing the carbid along said runway; doors located in said runway and movable into and out of a position within said runway, to form compartments therein; means for imparting movement to said doors; and means for precipitating the contents of one of said compartments into the generating-chamber.

23. An acetylene-gas generator, adapted to generate gas from carbid introduced in bulk, comprising a generating-chamber; a carbid-runway located therein; a door mounted in said runway and movable in the direction of movement of the carbid, adapted to move the carbid along said runway; means for imparting movement to said door; charge-forming mechanism located in said runway, adapted to form a carbid charge; and means for precipitating said formed charge into the generating-chamber.

24. An acetylene-gas generator, adapted to generate gas from carbid introduced in bulk, comprising a generating-chamber; a carbid-runway located therein; a door pivotally mounted within said runway and movable in the direction of movement of the carbid, adapted to move the carbid therethrough; means for imparting movement to said door at predetermined periods; charge-forming mechanism located in said runway, adapted to form a carbid charge; and means for precipitating said formed charge into the generating-chamber.

25. An acetylene-gas generator, adapted to generate gas from carbid introduced in bulk, comprising a generating-chamber; a carbid-runway located therein; a door pivotally mounted in and forming a part of said runway and movable in the direction of movement of the carbid, adapted to move the carbid therethrough; means for imparting movement to said door; charge-forming mechanism located in said runway, adapted to form a carbid charge; and means for precipitating said formed charge into the generating-chamber.

26. An acetylene-gas generator, adapted to generate gas from carbid introduced in bulk, comprising a generating-chamber; a carbid-runway located therein; doors mounted to have a movement into and out of said runway to form compartments therein; means for imparting movement to said doors; a pivotally-mounted door located at one end of and forming a portion of said runway; means, operated at a predetermined period of movement of said compartment-forming means, for imparting movement to said door, whereby the carbid will be positively forced along said runway; and means for precipitating the contents of one of said compartments into the generating-chamber.

27. An acetylene-gas generator, comprising a generating-chamber; a carbid-runway located therein; doors mounted to have a movement into and out of said runway, to form compartments therein, said doors having rack-bars; pinions mounted to have a positive coöperating relation to said rack-bars; a vertically-moving frame located within said generator; connections between said frame and said pinions for imparting a positive and simultaneous movement to said doors when said frame has reached a predetermined point in its movement; a pivotally-mounted door located in and forming a part of said runway; operative connections between said door and said frame, for imparting movement to said door, when said frame is at a predetermined point in its movement; and means for precipitating the contents of one of said compartments into the generating-chamber.

28. An acetylene-gas generator, comprising a generating-chamber; a carbid-receptacle located therein; a carbid-runway formed in said receptacle; mechanism for forming a carbid charge, during the passage of the carbid over said runway; an opening for the passage of the carbid formed at the end of said runway, said opening being normally closed; and means, operated by the movement of the carbid-charge-forming mechanism, for releasing said closing mechanism.

29. An acetylene-gas generator, adapted to generate gas from carbid introduced in bulk, comprising a generating-chamber; a carbid-receptacle located therein; a carbid-runway located in said chamber, said runway having an open top; doors located in said runway, movable into and out of position within said runway, to form compartments therein said doors having a simultaneous movement; means for imparting a movement to said doors; and means, operated by said compartment-forming means, for precipitating the contents of one of said compartments into the generating-chamber.

30. An acetylene-gas generator, adapted to generate gas from carbid introduced in bulk, comprising a generating-chamber; a carbid-receptacle located therein; carbid-charge-forming mechanism located in the path of movement of the carbid; a door pivotally mounted, adapted to receive said formed charge, said door being normally held closed; and means, operated by the forming mechanism, for tripping said holding mechanism, whereby said charge will be precipitated into the generating-chamber.

31. An acetylene-gas generator, comprising a generating-chamber; a carbid-receptacle located therein; a carbid-runway located in said chamber; means for forming compartments in said runway; a door pivotally mounted for receiving the contents of one of said compartments, said door being normally held closed; and means, operated positively and solely by said compartment-forming means, for tripping said holding mechanism, whereby said contents will be precipitated into said generating-chamber.

32. An acetylene-gas generator, adapted to generate gas from carbid introduced in bulk, comprising a generating-chamber; a carbid-runway located therein; means mounted therein, for positively forcing the carbid along said runway; means for forming compartments in said runway; a door, pivotally mounted, for receiving the contents of one of said compartments, said door being normally held closed; and means for tripping said holding mechanism at a predetermined period whereby said contents will be precipitated into the generating-chamber.

33. An acetylene-gas generator, adapted to generate gas from carbid introduced in bulk, comprising a generating-chamber; a carbid-runway located therein; means, mounted therein, for positively forcing the carbid along said runway; means for forming compartments in said runway; a door, pivotally mounted, for receiving the contents of one of said compartments, said door being normally held closed; and means, automatically operated, for tripping said holding mechanism, whereby said contents will be precipitated into the generating-chamber.

34. An acetylene-gas generator, adapted to generate gas from carbid introduced in bulk, comprising a generating-chamber; a carbid-runway located therein, said runway having an open top; means for forming compartments within said runway, each compartment having an open top; a door pivotally mounted, adapted to receive the contents of one of said compartments, said door being normally held closed; and means operated by said compartment-forming means, for tripping said holding mechanism, whereby said contents will be precipitated into said generating-chamber.

35. An acetylene-gas generator, adapted to generate gas from carbid introduced in bulk, comprising a generating-chamber; a carbid-runway formed therein; doors mounted to have a movement into and out of said runway, whereby compartments will be formed; mechanism for imparting movement to said doors; a tilting platform mounted at one end of said runway, adapted to receive the contents of one of said compartments, said platform being normally held in a closed position; and means for tripping said holding mechanism at a predetermined period of movement of said compartment-forming mechanism.

36. An acetylene-gas generator, adapted to generate gas from carbid introduced in bulk, comprising a generating-chamber; a carbid-runway; means for forming compartments in said runway; a tilting platform located in said runway, adapted to receive the contents of one of said compartments and precipitate the same into the generating-chamber; means for normally holding said platform in one position; and means, operated positively and solely by the compartment-forming means, for tilting said platform.

37. An acetylene-gas generator, adapted to generate gas from carbid introduced in bulk, comprising a generating-chamber; a carbid-receptacle located therein; carbid-charge-forming mechanism located in the path of movement of the carbid; a door, pivotally mounted, adapted to receive the formed charge, said door being normally held closed; means operated by said charge-forming mechanism for tripping said holding mechanism, whereby said charge will be precipitated into the generating-chamber; and means for returning said door to its normal position.

38. An acetylene-gas generator, comprising a generating-chamber; a carbid-runway formed therein, said runway having an open top; means for forming compartments within said runway, each compartment having an open top; a door pivotally mounted, adapted to receive the contents of one of said compartments, said door being normally held closed; means, operated by said compartment-forming means, for tripping the holding mechanism, whereby said contents will be precipitated into said generating-chamber; and means for returning said door to its normal position.

39. An acetylene-gas generator, comprising a generating-chamber; a carbid-receptacle located therein; carbid-charge-forming mechanism located in the path of movement of the carbid; a door, adapted to receive the formed charge, said door being normally held closed; means operated by the charge-forming mechanism, for tripping said holding mechanism, whereby the charge will be precipitated into the generating-chamber; and means, independently operated, for automatically returning said door to its normal position.

40. An acetylene-gas generator, comprising a generating-chamber; a carbid-runway formed therein; means for forming compartments within said runway; a door pivotally mounted, to receive the contents of one of said compartments, said door being normally held closed; means, operated by said compartment-forming means, for tripping the holding mechanism, whereby said contents will be precipitated into said generating-chamber; and independent means for returning said door to its normal position.

41. An acetylene-gas generator, adapted to generate gas from carbid introduced in bulk comprising a generating-chamber; a carbid-runway formed therein; doors mounted to have a movement into and out of said runway, whereby compartments will be formed; mechanism for imparting movement to said doors; a tilting platform mounted in juxtaposition to the delivery end of said runway, adapted to receive the contents of one of said compartments, said platform being held normally in a closed position; means located in the path of movement of said compartment-forming mechanism, for tripping said holding mechanism at a predetermined period of movement of said compartment-forming mechanism; and means for returning said platform to its normal position.

42. An acetylene-gas generator, adapted to generate gas from carbid introduced in bulk, comprising a generating-chamber; a carbid-runway formed therein; doors mounted to have a movement into and out of said runway, whereby compartments will be formed; mechanism for imparting movement to said doors; a tilting platform mounted in juxtaposition to the delivery end of said runway, adapted to receive the contents of one of said compartments, said platform being normally held in closed position; means located in the path of movement of the compartment-forming mechanism, for tripping said holding mechanism at a predetermined period of movement of said compartment-forming mechanism; and means for automatically returning said platform to its normal position, said means being operated independently of the movement of said compartment-forming mechanism.

43. An acetylene-gas generator, adapted to generate gas from carbid introduced in bulk, comprising a generating-chamber; a carbid-runway located therein; doors movable into and out of said runway to form compartments therein; a door pivotally mounted at one end of said runway adapted to receive the contents of one of said compartments, said door being normally held in its closed position; mechanism for imparting movement to said movable doors; and tripping mechanism, located in the path of movement of said door-moving mechanism, for automatically releasing said door from its normal position, whereby the charge located on said door will be precipitated into the generating-chamber, at a predetermined period in the movement of said doors.

44. An acetylene-gas generator, comprising a generating-chamber; a carbid-runway located therein; doors movable into and out of said runway to form compartments therein; mechanism for imparting movement to said doors; a door mounted at the lower end of said runway, adapted to receive the contents of one of said compartments, said door being normally held in a closed position; tripping mechanism, located in the path of movement of said door-moving mechanism, for automatically releasing said door from its normal position whereby the charge located thereon will be precipitated into the generating-chamber; and independent means for returning said door to its normal position.

45. The combination, in an acetylene-gas generator, with a carbid-runway adapted to receive the carbid from the carbid-receptacle; of a tilting platform mounted in juxtaposition to said runway; means for imparting an intermittent pivotal movement to said platform; and a yielding partition mounted to receive the impact of the platform when returning to its closed position.

46. In an acetylene-gas generator, the combination with a carbid-runway adapted to receive the carbid from the carbid-receptacle; of a tilting platform mounted in juxtaposition to and forming the lower end of said runway; means for imparting an intermittent pivotal movement to said platform; and a yielding partition, forming the movement-limiting end of the runway for said carbid, mounted to receive the impact of the platform when returned to its normal position.

47. An acetylene-gas generator, comprising a generating-chamber; a carbid-receptacle located at the top thereof, said receptacle having a delivery-opening; a series of plates extending vertically within said chamber, below said receptacle, said plates being located on opposite sides of the diameter of the generator, the opening in said receptacle being located to deliver the contents to the space between said plates; a bottom formed between said plates, forming a runway; and a tilting platform mounted at the end of said bottom, said platform being adapted to deliver the carbid to be decomposed, whereby the generated gas is allowed to mingle with the carbid, thereby drying the gas.

48. An acetylene-gas generator, comprising two members held in telescopical relation to each other; a peripheral support for the inner member, secured to the outer member; a water seal formed between said members; and a series of locking devices, carried by said inner member, adapted to engage with said outer member removably, to hold said members in their telescoped position.

49. An acetylene-gas generator, comprising an outer and an inner member arranged to telescope; a flange secured about the inner periphery of said outer member, to support said inner member; a water seal formed between said members said seal covering said flange; means, carried by said inner member, for preventing the passage of the carbid into said water seal; and a series of locking devices, carried by said inner member, adapted to removably engage with said outer member, to hold said members fixedly in their telescoped position.

50. A water-supply for acetylene-gas-generating apparatus, comprising a reservoir, having its water-level held uniformly on the same horizontal plane; means for supplying water thereto; and independent connections between said reservoir and the generating-chamber and the gasometer, for holding the level of the water seals in said chamber and said gasometer at approximately the same horizontal plane, independently of each other.

51. A water-supply for acetylene-gas-generating apparatus, comprising a reservoir; means for supplying water thereto; independent connections between said reservoir and the generating-chamber and the gasometer, for holding the level of the water seals in said chamber and said gasometer at approximately the same plane as the water-level in said reservoir, independently of each other.

52. An acetylene-gas generator, comprising a generating-chamber; a carbid-receptacle located therein; an opening formed in said generator leading to said receptacle, said opening being adapted to allow of the entry of carbid; means for automatically holding said opening closed; a refilling device removably connected to said generator over said opening, said device being normally closed; means for releasing said closing means after said device is in position, whereby said generating-chamber will remain closed during the filling operation; and means for feeding the carbid to said generating-chamber.

53. The combination with an acetylene-gas generator automatically held sealed against the entrance of air; of a refilling device normally closed, removably connected to said generator, the opening of said device, when filled and in position, allowing the carbid to disturb the sealed condition of the generator without permitting the air to enter therein.

54. An acetylene-gas generator comprising a generating-chamber; an opening formed at the top thereof; a cushion formed contiguous to said opening; a door hingedly mounted to be normally held seated against said cushion and automatically close said opening; and a refilling device, adapted to be passed into said opening, the contents of said refilling device serving to move said door from its closing position, substantially as described.

55. A water-supply for acetylene-gas-generating apparatus, comprising a reservoir; means for supplying water thereto; a valved connection between said reservoir and the generating-chamber, to prevent the return of the water therefrom; and a connection between said reservoir and the gasometer, said connections being independent of each other, and adapted to retain an independent uniform level in said chamber and said gasometer.

56. The combination with an acetylene-gas generator, having a bottom adapted to receive the residue, said bottom having an opening; of a tube, normally sealed, connected to said opening, said tube having a valved passageway; and a water-supply pipe, having its outlet within the tube, said supply-pipe serving to agitate the contents of said tube and cause the residue to be withdrawn therefrom.

57. The combination with an acetylene-gas generator, having a bottom adapted to receive the residue, said bottom having an opening; of a tube, normally sealed, connected to said opening, said tube having a plurality of passage-ways and outlets, each controllable; and a water-supply pipe, adapted to agitate the contents of said tube and cause the residue to be withdrawn therefrom.

58. The combination with an acetylene-gas generator having a bottom adapted to receive the residue, said bottom having an opening; of a tube, normally sealed, connected to said opening, said tube having a plurality of valved outlets located at varying heights relatively to said generator; and a water-supply pipe adapted to agitate the contents of said tube and cause the residue to be withdrawn therefrom.

59. The combination with an acetylene-gas generator, having a bottom adapted to receive the residue, said bottom having an outlet; of a tube connected to said outlet, said tube extending upwardly and then downwardly outside said generator; a valve located at the upper bend of said tube; a valved connection between the upward and downward portions of said tube, said connection being below said upper bend; and a pipe connected to a source of water-supply, extending into said tube, whereby the residue will be forced through said tube with varying degrees of pressure.

60. An acetylene-gas generator adapted to generate gas from carbid introduced in bulk, said generator comprising a generating-chamber; a carbid-runway located therein, said runway having relatively an open top; means for forming compartments in said runway, each compartment having relatively said open top; and means for precipitating the contents of one of said compartments into the generating-chamber.

In witness whereof we have hereunto set our hands in the presence of two witnesses.

PHILIPPE LAPERLE.
OSCAR P. BOULARD.

Witnesses:
HORACE G. SEITZ,
A. W. YOUNG.